(12) United States Patent
Gill et al.

(10) Patent No.: US 11,023,541 B2
(45) Date of Patent: Jun. 1, 2021

(54) METHODS AND SYSTEMS FOR PROVIDING MEDIA RECOMMENDATIONS BASED ON USER LOCATION

(71) Applicant: Rovi Guides, Inc., Santa Clara, CA (US)

(72) Inventors: Daren Gill, Concord, MA (US); Abubakkar Siddiq, Methuen, MA (US); Ahmed Nizam Mohaideen P, Kovilpatti (IN); China Karnati, Bangalore (IN); Sashikumar Venkataraman, Andover, MA (US); Sankar Ardhanari, Windham, NH (US)

(73) Assignee: Rovi Guides, Inc., San Jose, CA (US)

( * ) Notice: Subject to any disclaimer, the term of this patent is extended or adjusted under 35 U.S.C. 154(b) by 550 days.

(21) Appl. No.: 14/673,393

(22) Filed: Mar. 30, 2015

(65) Prior Publication Data

US 2016/0189042 A1 Jun. 30, 2016

Related U.S. Application Data

(60) Provisional application No. 62/098,077, filed on Dec. 30, 2014.

(51) Int. Cl.
| | |
|---|---|
| G06F 3/0481 | (2013.01) |
| G06F 16/9535 | (2019.01) |
| G06F 16/435 | (2019.01) |
| G06Q 30/02 | (2012.01) |
| G06Q 50/00 | (2012.01) |
| H04M 1/72412 | (2021.01) |
| H04M 1/72448 | (2021.01) |
| H04M 1/72469 | (2021.01) |
| G06F 3/0482 | (2013.01) |

(Continued)

(52) U.S. Cl.
CPC ........ *G06F 16/9535* (2019.01); *G06F 3/0482* (2013.01); *G06F 3/04817* (2013.01); *G06F 16/435* (2019.01); *G06N 5/04* (2013.01); *G06Q 30/00* (2013.01); *G06Q 30/0241* (2013.01); *G06Q 50/01* (2013.01); *H04M 1/72412* (2021.01); *H04M 1/72448* (2021.01); *H04M 1/72469* (2021.01)

(58) Field of Classification Search
USPC ....... 709/201, 203, 219, 232; 706/45, 46, 62
See application file for complete search history.

(56) References Cited

U.S. PATENT DOCUMENTS

| | | |
|---|---|---|
| 6,239,794 B1 | 5/2001 | Yuen et al. |
| 6,388,714 B1 | 5/2002 | Schein et al. |

(Continued)

*Primary Examiner* — Younes Naji
*Assistant Examiner* — Da T Ton
(74) *Attorney, Agent, or Firm* — Haley Guiliano LLP

(57) ABSTRACT

Methods and systems are described herein to recommend media assets to a user based on user location. A media guidance application may identify, using control circuitry, a user location. The media guidance application may generate a list of a plurality of media assets that match a user profile. The media guidance application may determine whether subject matter of a first media asset of the plurality of media assets is inconsistent with the user location. The media guidance application may remove the first media asset from the list in response to determining that the subject matter of the first media asset is inconsistent with the user location.

14 Claims, 5 Drawing Sheets

(51) Int. Cl.
  *G06N 5/04* (2006.01)
  *G06Q 30/00* (2012.01)

(56) References Cited

U.S. PATENT DOCUMENTS

| | | | |
|---|---|---|---|
| 6,564,378 | B1 | 5/2003 | Satterfield et al. |
| 6,756,997 | B1 | 6/2004 | Ward, III et al. |
| 7,165,098 | B1 | 1/2007 | Boyer et al. |
| 7,529,741 | B2 | 5/2009 | Aravamudan et al. |
| 7,644,075 | B2 | 1/2010 | Zeng et al. |
| 7,761,892 | B2 | 7/2010 | Ellis et al. |
| 8,046,801 | B2 | 10/2011 | Ellis et al. |
| 8,510,247 | B1 | 8/2013 | Kane, Jr. et al. |
| 8,660,847 | B2 | 2/2014 | Soemo et al. |
| 8,682,725 | B2 | 3/2014 | Jain et al. |
| 8,762,326 | B1 | 6/2014 | Zhou et al. |
| 8,849,958 | B2 | 9/2014 | Liebald et al. |
| 2002/0174430 | A1 | 11/2002 | Ellis et al. |
| 2003/0110499 | A1 | 6/2003 | Knudson et al. |
| 2005/0090242 | A1 | 4/2005 | Kotzin et al. |
| 2005/0251827 | A1 | 11/2005 | Ellis et al. |
| 2008/0005764 | A1 | 1/2008 | Arling et al. |
| 2008/0091722 | A1* | 4/2008 | Wendelrup .......... G06F 16/9535 |
| 2009/0100478 | A1 | 4/2009 | Craner et al. |
| 2010/0153885 | A1 | 6/2010 | Yates |
| 2010/0201891 | A1 | 8/2010 | Laroia et al. |
| 2011/0092221 | A1* | 4/2011 | Zubas ............... H04M 1/72547 455/456.1 |
| 2011/0197232 | A1* | 8/2011 | Sekiguchi .......... H04N 21/4821 725/44 |
| 2012/0179642 | A1 | 7/2012 | Sweeney et al. |
| 2012/0233640 | A1* | 9/2012 | Odryna ............. H04N 21/4622 725/45 |
| 2013/0110823 | A1 | 5/2013 | Su et al. |
| 2013/0159506 | A1 | 6/2013 | Stern et al. |
| 2013/0246432 | A1 | 9/2013 | Paskin et al. |
| 2013/0304818 | A1 | 11/2013 | Brumleve et al. |
| 2014/0025734 | A1 | 1/2014 | Griffin |
| 2014/0169795 | A1 | 6/2014 | Clough |
| 2014/0201227 | A1 | 7/2014 | Hamilton-Dick et al. |
| 2014/0229465 | A1* | 8/2014 | Rose .................... G06F 16/489 707/722 |
| 2015/0074131 | A1* | 3/2015 | Fernandez ........... G06F 16/435 707/758 |
| 2015/0121413 | A1* | 4/2015 | Ramakrishnan .... H04L 67/2842 725/25 |
| 2015/0317398 | A1* | 11/2015 | Phillips ................ G06F 16/285 707/734 |
| 2016/0035347 | A1 | 2/2016 | Agarwal et al. |
| 2016/0037332 | A1 | 2/2016 | Egeler et al. |
| 2016/0092447 | A1 | 3/2016 | Venkataraman et al. |
| 2016/0094889 | A1 | 3/2016 | Venkataraman et al. |

* cited by examiner

METHODS AND SYSTEMS FOR PROVIDING MEDIA RECOMMENDATIONS BASED ON USER LOCATION

CROSS REFERENCE TO RELATED APPLICATION

This application claims priority to U.S. Provisional Application No. 62/098,077, filed Dec. 30, 2014, which is incorporated herein by reference in its entirety.

BACKGROUND

Media guidance applications may provide media asset recommendations to users. Traditional media guidance applications may provide a user with media recommendations based on the user's location without considering if the subject matter of the recommended media is consistent with the user location. For example, a traditional media guidance application may recommend a song to a user currently in a coffee shop because other users in the coffee shop previously enjoyed the song. However, the traditional media guidance application may not determine if the song is about subject matter consistent with the user's location. For example, the song may be about sunny days, and the user's location may be receiving heavy snow.

The subject matter of a media asset may be inconsistent with a user's location if the subject matter of the media asset is uncommon or unavailable at the user location. The subject matter of a media asset may also be inconsistent with a user's location if the subject matter is associated with a location that is not the user location, or is greater than a threshold distance away from the user location.

SUMMARY

Accordingly, methods and systems are disclosed herein for a media guidance application that recommends media assets with subject matter that is consistent with a user location. The media guidance application may identify a user location based on GPS data or information from a user profile. For example, the media guidance application may determine that a user location is New York City based on data from a user's cell phone's GPS.

The media guidance application may generate a list of a plurality of media assets that match a user profile. The media guidance application may generate this list based on analyzing the user profile to determine that the user is likely to enjoy each media asset in the plurality of media assets. For example, a user's profile may indicate that the user is interested in funny television shows. The media guidance application may generate a list of a plurality of media assets, where the media assets are "30 Rock" and "The Fresh Prince of Bel Air," since both "30 Rock" and "The Fresh Prince of Bel Air" are funny television shows. The media guidance application may determine that the subject matter of "30 Rock" is New York since the show is set in New York. The media guidance application may determine that the subject matter of "The Fresh Prince of Bel Air" is Los Angeles since the show is set in Los Angeles.

In some embodiments, the media guidance application may generate the list in response to a user's search query. For example, a user may search for "funny television shows" using the media guidance application. In response to the user's search query, the media guidance application may generate a list of a plurality of media assets, where the media assets are "30 Rock" and "The Fresh Prince of Bel Air".

The media guidance application may determine whether the subject matter of a first media asset in the list of the plurality of media assets is inconsistent with the user location. If the media guidance application determines that the subject matter of the first media asset is inconsistent with the user location, it may remove the first media asset from the list of the plurality of media assets. In some embodiments, the subject matter of the first media asset may be inconsistent with the user location if the first media asset is associated with weather that is not common at the user location. For example, the media guidance application may determine that the subject matter of a documentary about snow is "snow". The media guidance application may remove the documentary from a list being generated for a user in Texas, as Texas does not receive snow, and thus the subject matter of the documentary is inconsistent with the user location of Texas.

In some embodiments, the subject matter of the first media asset may be inconsistent with the user location if the first media asset includes objects that are not available, for purchase or otherwise, at the user location. For example, the media guidance application may determine that the subject matter of a movie in which the characters smoke Cuban cigars is "Cuban cigars." The media guidance application may remove the movie from a list generated for a user in the USA, as Cuban cigars are not available for purchase in the USA, and thus the movie would be inconsistent with the user location of the USA.

In some embodiments, the subject matter of the first media asset may be inconsistent with the user location if the first media asset is associated with a location that is not the user location, or is more than a threshold distance away from the user location. For example, the media guidance application may remove the television show "30 Rock," which has the subject matter of New York, from a list generated for a user in Los Angeles since the television show has subject matter that is a different location than the user location of Los Angeles, and hence would be inconsistent with the user location.

In some embodiments, the media guidance application may then recommend the list of the plurality of media assets to a user. For example, the media guidance application may generate a list of a plurality of media assets for a user who enjoys funny television shows, where the media assets are "30 Rock" and "The Fresh Prince of Bel Air." The user location may be New York City. "The Fresh Prince of Bel Air" has the subject matter of Los Angeles, so may be determined to be inconsistent with the user location of New York City. Hence, "The Fresh Prince of Bel Air" may be removed from the list. The media guidance application may recommend "30 Rock" to the user.

In some embodiments, the media guidance application may generate an explanation for each media asset in the list of the plurality of media assets to provide information about why these media assets are relevant to the user. For example, upon recommending "30 Rock" to a user who enjoys funny television shows and lives in New York City, the media guidance application may provide an explanation stating that "30 Rock" was recommended to the user because the user enjoys funny television programming set in the user's location of New York City. In some embodiments, the media guidance application may generate icons associated with each media asset in the plurality of media assets, wherein the icons distinguish media assets inconsistent with the user location from media assets consistent with the user location. For example, the media guidance application may generate a list of a plurality of media assets for a user who enjoys funny television shows, where the media assets are "30 Rock" and "The Fresh Prince of Bel Air." The user location may be New York City. "The Fresh Prince of Bel Air" has the subject matter of Los Angeles, so the subject matter may be determined to be inconsistent with the user location of New York City. The media guidance application may generate an icon representing that the subject matter of the associated media asset is consistent with the user location next to "30 Rock" and generate an icon representing that the subject matter of the associated media asset is inconsistent with the user location next to "The Fresh Prince of Bel Air."

In some embodiments, the media guidance application may automatically update the user location, and update the list of the plurality of media assets based on the user location. For example, the media guidance application may generate a list of a plurality of media assets for a user who enjoys funny television shows, where the media assets are "30 Rock" and "The Fresh Prince of Bel Air." The user may fly from New York City to Los Angeles. In response to the user's location change, the media guidance system may change the subject matter of "30 Rock" from being consistent with the user's location to being inconsistent with the user's location. Additionally, the media guidance application may change the subject matter of "The Fresh Prince of Bel Air" from being inconsistent with the user's location to being consistent with the user's location.

In some embodiments, the media guidance application may determine trending topics associated with the list of the plurality of media assets, and provide this list to the user. For example, the media guidance application may generate a list of a plurality of media assets for a user who enjoys funny television shows, where the media assets are "30 Rock" and "The Fresh Prince of Bel Air." Trending topics associated with these shows may include the trending topic "Best Shows Ever!" which refers to users discussing their all-time favorite shows. This trending topic and its associated information may be recommended to the user.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
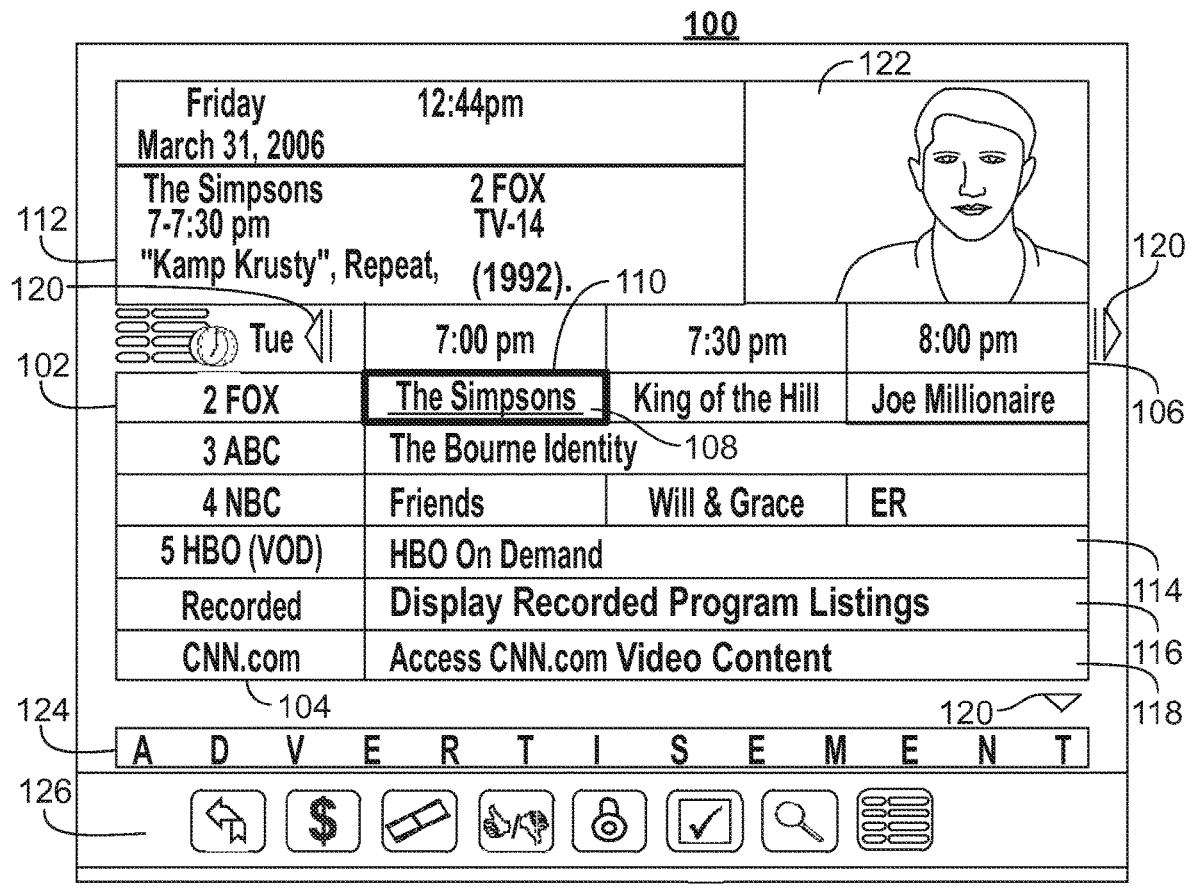
FIG. 1 shows an illustrative example of a display screen generated by a media guidance application in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

As referred to herein, a location may be any physical location or landmark. A location may refer to cities such as New York City or Boston. A location may refer to states such as New York State or Massachusetts. A location may refer to a country such as the United States of America or Canada. A location may refer to a continent such as North America or South America. A location may refer to a landmark such as the Statue of Liberty or the Empire State Building. A location may refer to geographical coordinates such as longitude and latitude values. A location may be a user address. The media guidance application may determine the type of location (e.g., city, state, country, landmark, etc.) to be used based on the available data and/or user preferences. It is understood that "location," as referred to in this disclosure, may refer to any type of location.

As referred to herein, a user location may comprise a location associated with a user device or a user profile. A location may be associated with a user device if the user device contains GPS, Wi-Fi, or other such location determination circuitry which determines that the user device is at the location. Location determination circuitry may be a component of control circuitry 304 and/or user device 500. For example, a cell phone may indicate that its location is in New York City if it is connected to a cell phone tower in New York City. A location may be associated with a user profile based on the frequency and relevance of the location's occurrences in the user profile. For example, a user's communications on a social networking page may indicate that the user frequently attends events that occur in New York City. The media guidance application may create a profile for the user that includes information from the user's communications, and analyze the frequency of the user's communications about New York City events to determine that the user location is in New York City.

The media guidance application may receive metadata about the user location from media content source 416 or media guidance data source 418 through communications network 414. The user location metadata may include information about the weather associated with the user location, the objects available at the user location, and the like. In some embodiments, weather may be associated with the user location based on common weather conditions found at the user location. In some embodiments, weather may be associated with the user location based on recent or current weather conditions at the user location. As referred to herein, weather conditions may include natural phenomena such as rain, snow, tornados, hurricanes, sunshine, cloudiness, humidity, floods, tides, earthquakes, volcanic activity, and the like.

As referred to herein, a user profile is data about a user that is accessed by a media guidance application. In some embodiments, the media guidance application may collect and analyze data about the user from various sources such as social networking websites, histories of user interactions with media assets, user search query histories, and the like to create a user profile. The media guidance application may store the user profile locally using storage circuitry 308 or at a remote location such as media guidance data source 418.

In some embodiments, a user profile may be associated with more than one user location. In some embodiments, the media guidance application may choose one of these user locations to use to recommend media assets to the user. For example, the user profile may contain a history of various locations visited by the user. The media guidance application may choose the most recently visited user location or the most frequently visited user location as the user location.

As referred to herein, subject matter of a media asset refers to a theme of the media asset. The subject matter of a media asset may be metadata associated with the media asset. The subject matter of a media asset may be a trending topic associated with the media asset. The subject matter of a media asset may be any object that is presented in the media asset. In some embodiments, a media asset may have more than one subject matter.

The media guidance application may receive metadata about the media asset from media content source 416 or media guidance data source 418 through communications network 414. The metadata may include information about the content of the media asset, such as the weather associated with the media asset, the objects presented in the media asset, the locations associated with the media asset, and the like. The metadata may be gathered from several sources, compiled, and analyzed at media content source 416 or media guidance data source 418. Media content source 416 or media guidance data source 418 may then provide the analyzed metadata to the media guidance application such that only non-redundant and relevant information is provided to the media guidance application. For example, media guidance data source 418 may gather data from the Internet website Wikipedia and the Internet website IMDb about the movie "Frozen." Both sources may provide data indicating that the main characters in the movie are "Elsa" and "Anna." Media guidance data source 418 may filter the redundant information out and only provide metadata to the media guidance application that indicates the main characters in "Frozen" once.

As referred to herein, consistent refers to the state of having metadata in common with. For example, the subject matter of a media asset may be consistent with a user location if the subject matter of the media asset has metadata in common with the user location. The subject matter of the media asset may be metadata associated with the media asset, and the user location may be associated with the same metadata. In some embodiments, the subject matter of a media asset may be consistent with a user location if the subject matter of the media asset is metadata of the media asset similar to or within a threshold of metadata associated with the user location.

As referred to herein, inconsistent refers to the state of having different metadata. For example, the subject matter of a media asset may be inconsistent with a user location if the subject matter of the media asset is metadata that is not metadata associated with the user location. In some embodiments, the subject matter of a media asset may be inconsistent with a user location if the subject matter of the media asset is metadata that is labelled as metadata inconsistent with the user location in a database in storage circuitry 308.

Figure 2:
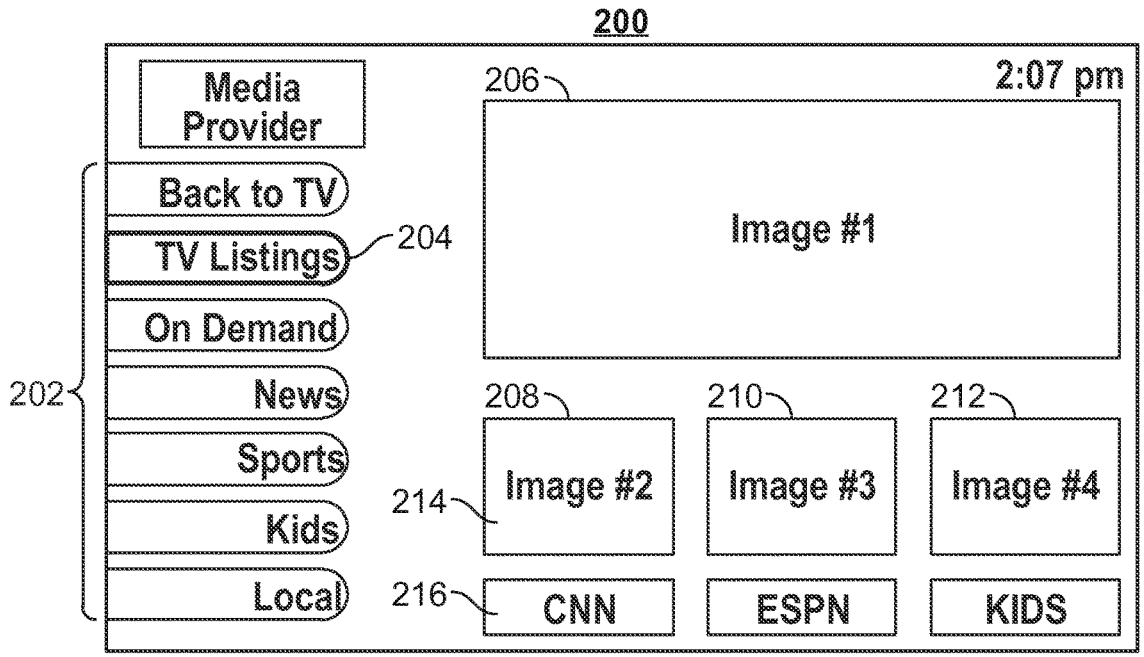
FIG. 2 shows another illustrative example of a display screen generated by a media guidance application in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
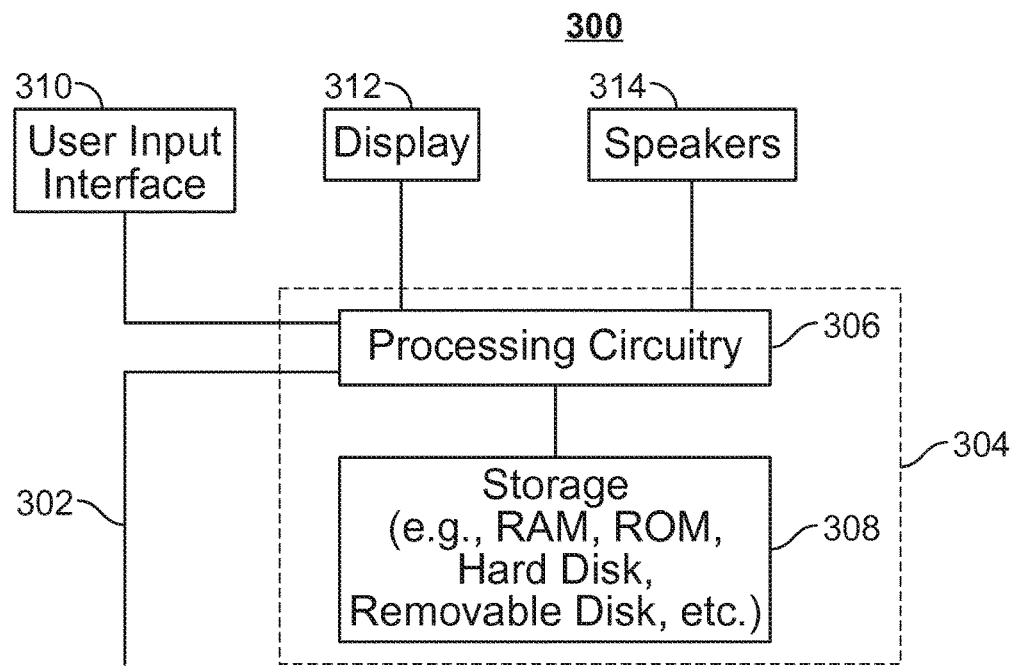
FIG. 3 is a block diagram of an illustrative user equipment device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Storage circuitry 308 may contain a database of metadata about media assets. The metadata may be used by the media guidance application to determine the subject matter of the media assets. The media guidance application may select any one metadatum of all the metadata associated with a media asset to be the subject matter of the media asset.

Storage circuitry 308 may contain a database of metadata about locations. The metadata of a user location may be compared to the subject matter of a media asset by the media guidance application to determine if the subject matter of a media asset is inconsistent with a user location.

For example, the media guidance application may receive information from user device 500 that a user location is New York City. The media guidance application may determine that metadata about the user location are the latitude and longitude coordinates of New York City. To determine if the movie "The Wolf of Wall Street" has subject matter consistent with the user location's metadata, the media guidance application may select the metadata "Wall Street" associated with the movie as the subject matter of the movie. The media guidance application may cross-reference, using control circuitry 304, the subject matter of the movie with the user location's metadata to determine that Wall Street is a part of New York City. Hence, the media guidance application may determine that the subject matter of the movie is consistent with the user location.

In some embodiments, the metadata associated with the media asset and the metadata associated with the user location may be ranked in order of relevance. For example, the user location of New York City may be associated with metadata of "New York State," "USA," and "North America," where "New York State" is the most relevant metadata and "North America" is the least relevant metadata. The ranking may describe how closely the metadata is associated with the user location or the media asset. The media guidance application may choose the metadata of the user location and media asset based on the associated relevance. The subject matter of a media asset may be more consistent with a user location if higher-ranked metadata of the media asset matches higher-ranked metadata of the user location, than if lower-ranked metadata of the media asset matches lower-ranked metadata of the user location.

In some embodiments, storage circuitry 308 may store a database of subject matters inconsistent with locations. To determine if the subject matter of a media asset is inconsistent with a user location, control circuitry 304 may compare the subject matter of the media asset with the subject matters inconsistent with the user location. If the subject matter of the media asset appears in the list of subject matters inconsistent with the user location, the media guidance application may determine that the subject matter of the media asset is inconsistent with the user location. For example, storage circuitry 308 may store a database indicating that subject matters of "Boston," "South America" and "boring," among others, are inconsistent with the location New York City. The media guidance application may compare the subject matter of "Boston" of the movie "The Town" to the subject matters inconsistent with New York City, and determine that the subject matter of the movie "The Town" is inconsistent with the user location.

In some embodiments, control circuitry 304 may cross-reference multiple subject matters associated with the media asset to multiple subject matters inconsistent with user locations. In some embodiments, the media guidance application may determine that the subject matter of a media asset is inconsistent with a user location if any one subject matter of the media asset is a subject matter inconsistent with the user location. In some embodiments, the media guidance application may determine that the subject matter of a media asset is consistent with a user location if any one subject matter of the media asset is a subject matter not inconsistent with the user location.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
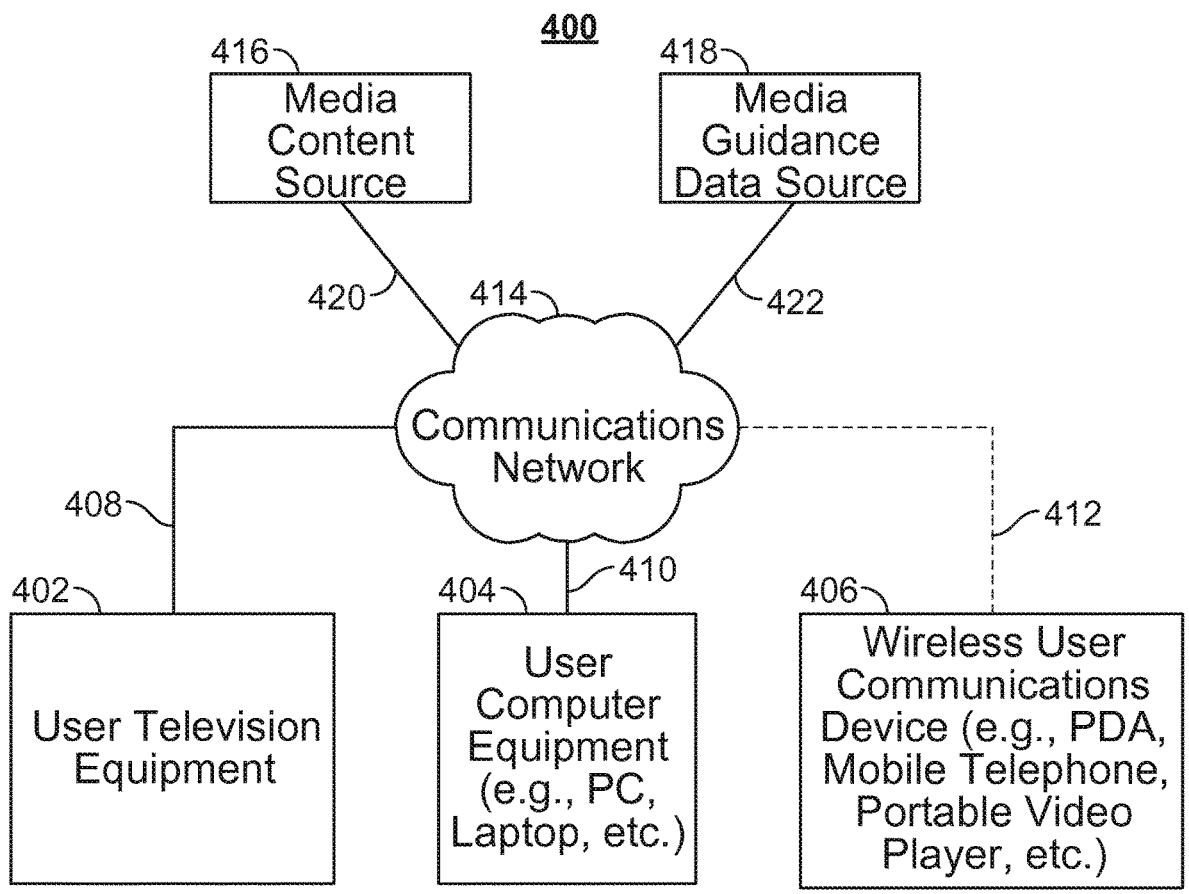
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

Figure 5:
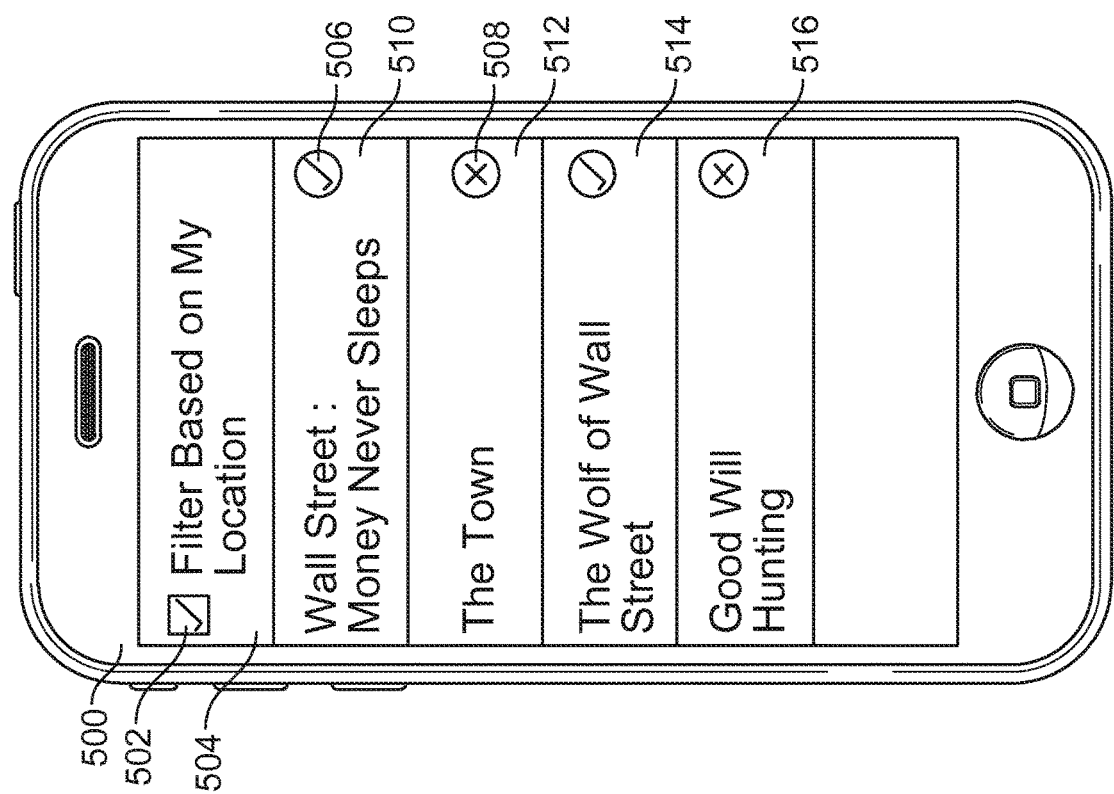
FIG. 5 is an illustrative example of a display generated by a media guidance application using icons to indicate whether the subject matter of media assets is consistent with a user location, in accordance with some embodiments of the disclosure.

FIG. 5 is an illustrative example of a display generated by a media guidance application using icons to indicate whether the subject matter of media assets is consistent with a user location, in accordance with some embodiments of the disclosure. User device 500 is illustrated as being a touchscreen smartphone, but may be user television equipment 402, user computer equipment 404, or wireless user communications device 406. The media guidance application may offer recommendations based on a user location as shown in FIG. 5.

A user may select checkbox 502 to receive recommendations based on the user's location. In some embodiments, checkbox 502 may be selected by default. In some embodiments, further options may be offered to the user in options bar 504. Other options offered to the user may include an option to filter recommendations based on a user profile, an option to receive user location from a GPS on user device 500, or an option to receive user location from a user profile. A user profile may be a collection of data that includes a user's preferences, activities, and demographics, collected and stored by the media guidance application. The user profile may be stored using storage circuitry 308. In some embodiments, information in the user profile may be compiled by combining user information from several sources such as social networking websites and media guidance application interaction data. This information may be received by the media guidance application through communications network 414.

The media guidance application may identify, using GPS data, that the user location is New York City. The media guidance application may provide media asset recommendations based on this identification. The media guidance application may create a list of movies based on a user profile. The user profile may contain data about media assets the user has accessed and liked in the past. This information may be used to determine which media assets the user is likely to enjoy in the future. For example, movies "Wall Street: Money Never Sleeps" 510, "The Town" 512, "The Wolf of Wall Street" 514, and "Good Will Hunting" 516 may be chosen based on a user profile. These movies may be generated for display on user device 500 as movies 510, 512, 514, and 516. In some embodiments, the list of media assets may be generated in response to a user search query. For example, movies 510, 512, 514, and 516 may be displayed on user device 500 in response to a user search query for "good movies."

Movies "Wall Street: Money Never Sleeps" 510 and "The Wolf of Wall Street" 514 have the subject matter of New York City due to their titles and settings. Movies "The Town" 512 and "Good Will Hunting" 516 have the subject matter of Boston as the events of the movies take place in Boston. The media guidance application may determine the subject matter associated with a media asset by analyzing metadata associated with the media asset. The media guidance application may determine a location to be the subject matter based on the fact that the location is associated with the media asset. For example, "The Wolf of Wall Street" is associated with subject matter related to Wall Street. Wall Street is located in New York City, so the media guidance application may determine that the movie "The Wolf of Wall Street" has the subject matter of New York City.

In some embodiments, the media guidance application may determine the subject matter of a media asset where the subject matter is weather. The media guidance application may cross-reference this subject matter with weather at a user location to determine if the subject matter of the media asset is consistent with the user location. The media guidance application may determine that the subject matter of the media asset is inconsistent with the user location if the weather is not common at the user location. For example, the media guidance application may determine that the subject matter of the movie "Twister" is tornados. The media guidance application may determine that tornados are not common in Los Angeles, and hence that the subject matter of the movie "Twister" is inconsistent with the user location of Los Angeles.

In some embodiments, the media guidance application may determine the subject matter of a media asset, where the subject matter is an object presented in the media asset. The media guidance application may cross-reference this object with a database in storage circuitry 308 to determine if the object is available at a user location. The media guidance application may determine that the subject matter of the media asset is consistent with the user location if the object is consistent with the user location. The media guidance application may determine that the subject matter of the media asset is inconsistent with the user location if the object is not available at the user location. For example, the media guidance application may determine that the subject matter of an advertisement for Cuban cigars is a Cuban cigar. The media guidance application may determine that Cuban cigars are not sold in the USA, and hence that the subject matter advertisement is inconsistent with the user location of the USA.

The media guidance application may receive this metadata from media content source 416 or media guidance data source 418 through communications network 414. In addition to the location associated with a media asset, the media guidance application may also receive metadata about the objects presented in the media asset. In some embodiments, this metadata may be stored in a database in storage circuitry 308.

The media guidance application may determine that movies 510 and 514 have subject matter consistent with the user location of New York City since the movies have the subject matter "New York City," which is the same as the user location. The media guidance application may determine that movies 512 and 516 have subject matter inconsistent with the user location since the movies have the subject matter "Boston," which is not the same as the user location. The media guidance application may generate icons to indicate which movies have subject matter that is consistent with the user location, in response to determining that the user's selection of checkbox 502 indicates that the results should be filtered based on location. The media guidance application may generate icon 506 in relation to movies 510 and 514 to indicate that the subject matter of movies 510 and 514 is consistent with the user location. The media guidance application may generate icon 508 to in relation to movies 512 and 516 to indicate that the subject matter of movies 512 and 516 is inconsistent with the user location.

In some embodiments, the media guidance application may determine that the subject matter of a media asset is inconsistent with a user location if the subject matter of the media asset is a location that is not the same as the user location. For example, a media guidance application may determine that the subject matter of a news story about a famous Indian actor dying is "India." The media guidance application may determine that the location of a first user is "the USA." The media guidance application may determine that the location "India" is not the same as the location "the USA" and hence that the subject matter of the news story is inconsistent with the first user's location. However, the media guidance application may determine that the subject matter of the news story is consistent with a second user's location, where the second user's location is "Calcutta, India." Moreover, the media guidance application may determine that the subject matter of the news story is consistent with a third user's location, where the third user's GPS location from user device 500 is "New York City, USA" because the third user's profile indicates that the third user has Indian heritage. Based on the third user's Indian heritage, the media guidance application may determine that the third user's location could also be "India" and is not just "New York City, USA," and hence that the subject matter of the news story is consistent with one of the third user's locations.

In some embodiments, the media guidance application may determine that the subject matter of a media asset is inconsistent with a user location if the distance between the location associated with the media asset and the user location is greater than a threshold distance. For example, the media guidance application may determine that a user is located in Buffalo using GPS data from user device 500. Buffalo is a city in New York State, which also contains New York City. Boston is not located in New York State. The media guidance application may be set up so that the threshold distance for determining that a media asset is consistent with a user location is one state. That is, if a user location and a media asset location are in the same state, the subject matter of the media asset may be consistent with the user location. Hence, the media guidance application may determine the subject matter of movies 510 and 514 is consistent with the user location, since the movies are associated with New York City and the user location is Buffalo, and both New York City and Buffalo are in New York State. The media guidance application may determine the subject matter of movies 512 and 516 is inconsistent with the user location since Boston and Buffalo are not in the same state.

In some embodiments, the media guidance application may determine that the subject matter of a media asset is inconsistent with a user location if objects are presented in the media asset that are not available at the user location. For example, the media guidance application may determine that the user location is New York City using user profile data. The media guidance application may further determine that Massachusetts Institute of Technology (MIT) is featured in movie 516, and that MIT is not in New York City. In response to this determination, the media guidance application may determine that the subject matter of movie 516 is inconsistent with the user location.

In some embodiments, the media guidance application may determine that an object is not available at the user location if the object is banned at the user location. In some embodiments, the media guidance application may determine that an object is not available at the user location if the object is not available in the inventories of the stores at the user location.

In some embodiments, the media guidance application may disable movies 512 and 516 from being accessed, in response to determining that the subject matter of movies 512 and 516 is inconsistent with the user location. In some embodiments, icon 508 may partially or fully hide movies 512 and 516 from being displayed on user device 500. In some embodiments, icons 506 and 508 may be auditory. For example, selecting movies 510 and 514 may cause a first sound to play, while selecting movies 512 and 516 may cause a second sound to play.

In some embodiments, the media guidance application may further filter the results based on the user profile. The media guidance application may use both user location and user profile data to generate recommendations. For example, a user profile may indicate that a user is a big fan of movie actor Matt Damon. The media guidance application may determine that movie 516 stars Matt Damon. The media guidance application may determine the subject matter of movie 516 is consistent with the user location even though its subject matter is not associated with the user location, as the user location preference may be overridden by the user profile preference. In some embodiments, the user location may be overridden by the user profile information based on the user profile history information. If the user accesses media assets with subject matter consistent with the user location more often, then the media guidance application may consider the user location more important than the user profile. If the user accesses media assets with subject matter consistent with the user profile more often, then the media guidance application may consider the user profile more important than the user location.

In some embodiments, the media guidance application may determine trending topics associated with the recommended media assets and present these to the user. Trending topics may be discussion topics that are popular among people. The media guidance application may determine trending topics by analyzing communications and behaviors of users of social networking websites, media sources, news outlets, and the user's social relations. For example, the media guidance application may determine that movies 510 and 514 are related to Wall Street using the metadata associated with these movies. The media guidance application may further determine that movies 510 and 514 are related to the user location of New York City as these movies feature New York City. The media guidance application may determine that a currently trending topic is "Occupy Wall Street" due to a rise in user communications on social networking websites about the Occupy Wall Street protests. The media guidance application may present the trending topic "Occupy Wall Street" to the user. In some embodiments, the media guidance system may further present news reports, user communications, or pictures related to the trending topic.

The media guidance application may determine trending topics by analyzing keywords of user communications. Examples of user communications may include updates on social networking websites, e-mails, blog posts, text messages, videos, or audio journals. The media guidance application may analyze keywords in user communications to determine keywords that are popular, and label these as trending topics. The trending topics may be updated at regular intervals so that the most popular keywords in recent user communications are labelled trending topics. The media guidance application may analyze the trending topics and their associated user communications to determine subject matter associated with each trending topic. To determine trending topics associated with a list of a plurality of media assets, the media guidance application may cross-reference the subject matter of each of the media assets in the list to the subject matter of the trending topics. Trending topics may be presented to the user if their subject matter matches that of the media assets in the list.

In some embodiments, the media guidance application may automatically update the user location and remove a second media asset from the list if the subject matter of the second media asset is inconsistent with the user location. In some embodiments, the media guidance application may further add a first media asset back to the list if the subject matter of the first media asset is consistent with the user location. For example, the media guidance application may initially determine the subject matter of movies 510 and 514 is consistent with a user location based on determining the user location is New York City, as described above in relation to FIG. 5. The media guidance application may determine, using GPS data from user device 500, that the user has moved to Boston. The media guidance application may determine that the new user location is Boston. In response to this determination, the media guidance application may determine that movies 510 and 514 have subject matter that is consistent with the location New York City, which is not the new user location of Boston. Hence, the media guidance application may determine that the subject matter of movies 510 and 514 is inconsistent with the new user location of Boston. The media guidance application may determine movies 512 and 516 have subject matter that is the location of Boston due to their settings, which is consistent with the new user location of Boston. In response to this determination, the media guidance application indicates movies 512 and 516 have subject matter that is consistent with the new user location to the user by displaying icon 506 next to them. The media guidance application may indicate the subject matter of movies 510 and 514 is inconsistent with the user location to the user by displaying icon 508 next to them.

Figure 6:
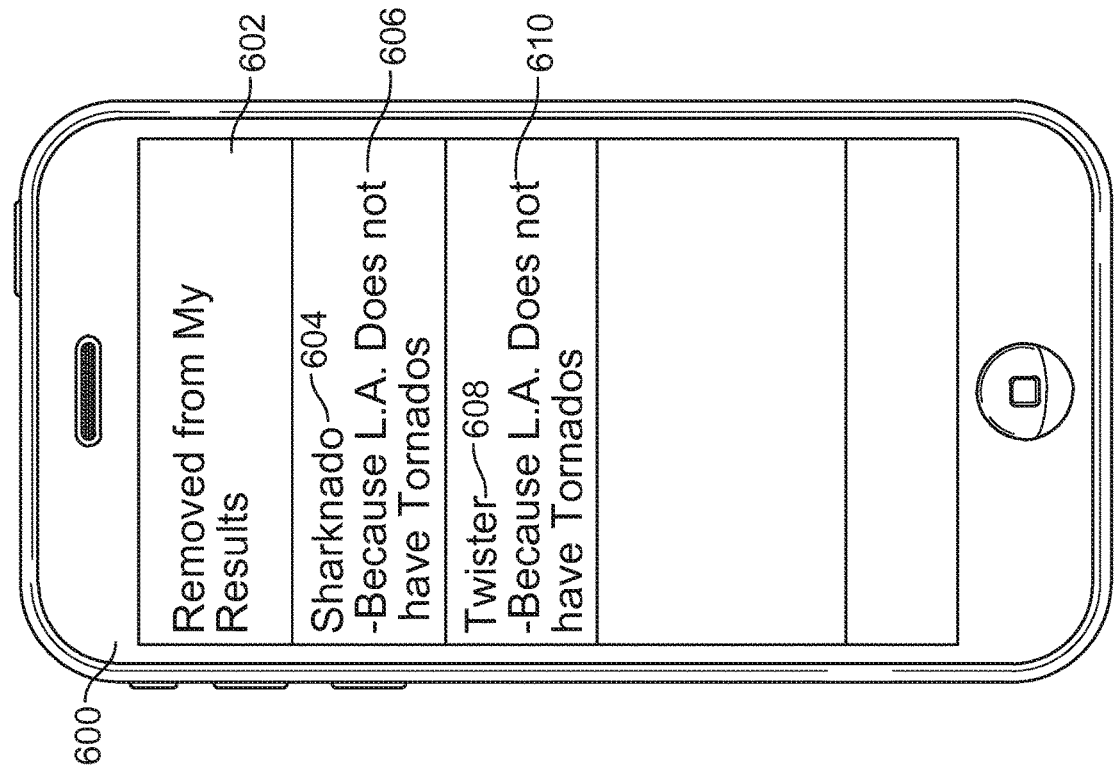
FIG. 6 is an illustrative example of a display generated by a media guidance application showing explanations associated with each media asset, in accordance with some embodiments of the disclosure.

FIG. 6 is an illustrative example of a display generated by a media guidance application showing explanations associated with each media asset, in accordance with some embodiments of the disclosure. The media guidance application may present to the user media assets that were not recommended to the user due to their subject matter being inconsistent with the user's location.

User device 600 may be used to present the removed results to the user. User device 600 may be similar to user device 500. Title 602 is displayed to inform the user that the media assets currently presented to the user were removed from the user's recommendation results. The user results may comprise media assets with subject matter consistent with the user location. For example, a user may search for media assets using the search term "movies about weather". Media guidance application may, using control circuitry 304, determine a list of media assets. The list of media assets may include the movies "Earthquake" and "Megafault," which are movies with the subject matter of "earthquake." In some embodiments, the media guidance application may analyze metadata associated with each media asset to determine a subject matter of the media asset. For example, the media guidance application may determine that metadata associated with a movie includes information about the actors, the director, and a synopsis of the movie. The media guidance application may determine that a keyword in the synopsis is "earthquake." The keyword may be identified based on the frequency of the keyword appearing in the synopsis, or its context in the synopsis. The media guidance application may then determine that the subject matter of the movie "Earthquake" is "earthquake." In some embodiments, the media guidance application may receive the subject matter of a media asset from media content source 416 or media guidance data source 418 through communications network 414. For example, the media guidance application may receive information from a remote database that the subject matter of the movie "Megafault" is "earthquake." The list of media assets may also include the movies "Sharknado" and "Twister," which are movies with the subject matter of "tornado." The media guidance application may determine that the user location is Los Angeles, which occasionally has earthquakes, but does not generally have tornados. The media guidance application may determine weather information about the user location by analyzing data from weather websites, weather channels, government weather agencies, and other reputable weather information sources. The media guidance application may then determine which media assets in this list are consistent with the user's location and display these to the user. For example, the media guidance application may determine that the movies "Earthquake" and "Megafault" are have subject matter that is consistent with the user's location of Los Angeles. The media guidance application may also display the media assets removed from the list because they had subject matter inconsistent with the user location. For example, the media guidance application may display movies "Sharknado" 604 and "Twister" 608.

In some embodiments, the media guidance application may generate an explanation for the removed media assets. The explanation may include a reason why the media assets were considered inconsistent with the user location. For example, the media guidance application may generate explanations 606 and 610 for movies 604 and 608 respectively, to inform the user why these movies were not presented to the user as recommendations whose subject matters are consistent with the user's location.

Figure 7:
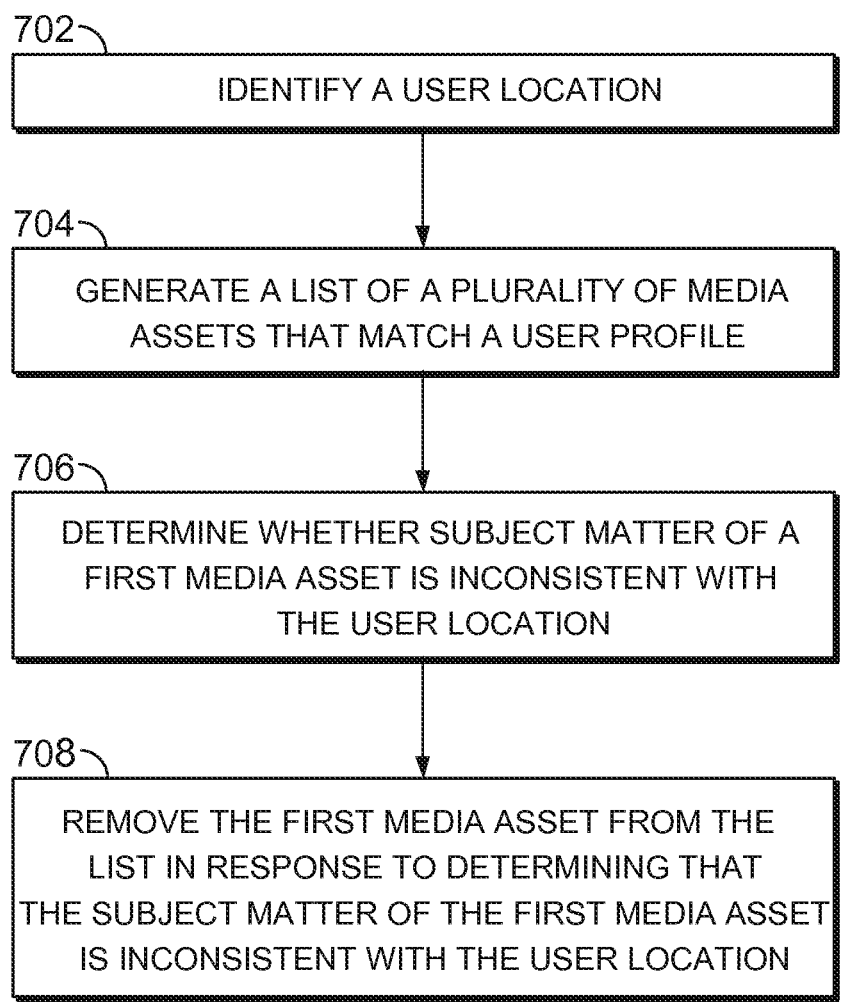
FIG. 7 is a flowchart of illustrative steps for recommending a media asset consistent with a user's location, in accordance with some embodiments of the disclosure.

FIG. 7 is a flowchart of illustrative steps for recommending a media asset in accordance with some embodiments of the disclosure. It should be noted that the process 700 or any step thereof could be performed on, or provided by, any of the devices shown in FIGS. 3-5. For example, process 700 may be executed by processing circuitry 304 (FIG. 3) as instructed by processing circuitry implemented on user equipment 402, 404, and/or 406 (FIG. 4) in order to provide information to a user. In addition, one or more steps of process 700 may be incorporated into or combined with one or more steps of any other process or embodiment.

Process 700 may begin at block 702, when the media guidance application identifies, using control circuitry 304, a user location. The media guidance application may identify a user location by using GPS data provided by user device 500, or by using data from a user profile, as described in relation to FIG. 5. In some embodiments, the media guidance application may pick one of several user locations. For example, a user may have a user device 500 which indicates through GPS data that the user is in Miami, Fla., USA. However, the user's profile may indicate that the user's hometown is New Delhi, India. The media guidance application may determine that the user is likely to be more interested in media assets related to the user's hometown, and hence identify New Delhi as the user's location. In some embodiments, the media guidance application may choose a user location from several user locations based on the latest user location, or the most frequently visited user location. In some embodiments, the media guidance application may use more than one user location in process 700. That is, the media guidance application may determine whether the subject matter of a media asset is consistent with any of the user's locations.

Process 700 may proceed to block 704, when the media guidance application generates, using control circuitry 304, a list of a plurality of media assets that match a user profile. The media guidance application may determine that a media asset matches a user profile if the metadata associated with the media asset is similar to data in the user profile. The list of the plurality of media assets may be stored using storage circuitry 308. In some embodiments, the number of media assets in the list may be determined by user provided preferences.

Process 700 may proceed to block 706, when the media guidance application determines, using control circuitry 304, whether subject matter of a first media asset is inconsistent with the user location. In some embodiments, the subject matter of a media asset may be inconsistent with a user location if weather associated with the media asset is not common at the user location. The media guidance application may determine that the weather associated with the media asset is uncommon by comparing it to a threshold. In some embodiments, each weather phenomenon may be associated with its own threshold. For example, the media guidance application may determine, using weather related metadata for the user location, that the user location is associated with 20 days of rainfall every year and 2 earthquakes every year. The media guidance application may determine that the weather thresholds indicate that rainfall is considered common if it happens more than 50 days in a year and earthquakes are considered common if they happen more than once a year. The user may be able to modify these default thresholds. The media guidance application may determine that rainfall is not common at the user location, while earthquakes are common at the user location. Hence, the media guidance application may determine that media assets associated with rainfall have subject matter inconsistent with the user location while media assets associated with earthquakes have subject matter consistent with the user location.

In some embodiments, the subject matter of a media asset may be inconsistent with a user location if an object presented in the media asset is not available at the user location. An object may be considered unavailable at the user location if it is not present at the user location, if it is not available for purchase at the user location, if it is banned at the user location, or any such similar factors. For example, a media asset may depict children eating Kinder Surprise chocolate eggs, which are banned in the USA. The user location may be the USA. The media guidance application may determine that the chocolate eggs are not available for purchase in the USA, and hence the media asset has subject matter inconsistent with the user location.

In some embodiments, the subject matter of a media asset may be inconsistent with a user location if a media asset location associated with the media asset is not the same as the user location. For example, the media asset may be a news story about a tsunami in Indonesia. The media guidance application may determine that the media asset location associated with the media asset is Asia. The media guidance application may determine that a user location is North America. Since the media asset location of Asia is not the same as the user location of North America, the media guidance application may determine that the news story has subject matter inconsistent with the user location.

In some embodiments, the subject matter of a media asset may be inconsistent with a user location if the distance between a media asset location associated with the media asset and the user location is greater than a threshold distance. The threshold distance may be a default value that can be modified by the user. For example, the media asset may be a news story about a tsunami in Indonesia. The media guidance application may determine that the user location is in New York City. The threshold distance may be a default value of 100 miles. The media guidance application may determine that Indonesia is more than 100 miles away from New York City, and hence the news story has subject matter inconsistent with the user location.

Process 700 may progress to block 708, when the media guidance application removes, using control circuitry 304, the first media asset from the list in response to determining that the subject matter of the first media asset is inconsistent with the user location. The media guidance application may determine that the subject matter of the first media asset is inconsistent with the user location as described in relation to block 706.

In some embodiments, the media guidance application may further recommend each media asset in the list of the plurality of media assets to the user. The media guidance application may recommend a media asset to the user by displaying an advertisement for the media asset, by scheduling the media asset for recording, by providing a reminder associated with the media asset, by adding the media asset to a user's playlist, by providing information about the media asset on user device 500, or by providing the media asset to the user.

In some embodiments, the media guidance application may automatically update the list of the plurality of media assets based on an updated user location. The user location may change due to new data from a GPS on user device 500, or a changed user profile. The media guidance application may receive this information and automatically update the user location. The media guidance application may then determine if the subject matter of any media asset in the list of the plurality of media assets is inconsistent with the updated user location. The media guidance application may remove from the list any media assets whose subject matter is inconsistent with the updated user location. In some embodiments, the media guidance application may add new or previously removed media assets to the list of the plurality of media assets if their subject matter is consistent with the updated user location. For example, the media guidance application may provide a user with a playlist containing highlights from football games starring the Pittsburgh Steelers football team, which is associated with the user location of Pittsburgh. In response to determining that the user profile has new information that the user purchased a plane ticket to Boston, the media guidance application may automatically update the user location to Boston and remove the Pittsburgh Steelers' games' highlights from the user's playlist. The media guidance application may add to the playlist highlights from football games starring the New England Patriots football team, which is associated with the updated user location of Boston.

In some embodiments, the media guidance application may generate the list of the plurality of media assets for display on user device 500. In some embodiments, each media asset of the list may be associated with an explanation. The explanation may include reasons for why the media asset is in the list of the plurality of media assets that match a user profile. For example, the media guidance application may generate an explanation that the movie "The Wolf of Wall Street" 510 is in the list of the plurality of media assets as described in FIG. 5 because the user profile indicated that the user has previously enjoyed movies about Wall Street. The explanation may include reasons for why the subject matter of the media asset is not inconsistent with the user location. For example, the media guidance application may generate an explanation that the movie "The Wolf of Wall Street" 510 is in the list of the plurality of media assets as described in FIG. 5 because the user location was determined to be New York City, movie 510 is associated with New York City, and hence the user location is same as the movie location.

In some embodiments, the media guidance application may generate a list of the media assets whose subject matter is inconsistent with the user location. The media guidance application may generate an explanation for each of these media assets. The media guidance application may do this as discussed in relation to FIG. 6.

In some embodiments, the media guidance application may generate for display information about each media asset in the list of the plurality of media assets. For example, the media guidance application may generate for display the titles of each of the media assets as shown in FIG. 5. In some embodiments, the media guidance application may generate icon 506 for each media asset in the list of the plurality of media assets. In some embodiments, the media guidance application may distinguish media assets whose subject matter is consistent with the user location from media assets whose subject matter is inconsistent with the user location by generating for display icon 506 for each of the former and icon 508 for each of the latter.

In some embodiments, the media guidance application may add a removed media asset back to the list of the plurality of media assets in response to determining that the removed media asset has subject matter associated with a user profile. For example, a media guidance application may remove scores from the 2015 Cricket World Cup in Australia and New Zealand from a user's suggested reading list in response to determining that the user location is India and that the scores are associated with a location of Australia and New Zealand which is not the same as the user location of India. The media guidance application may determine that a user profile shows a strong interest in cricket scores as the user frequently watches cricket games and accesses websites for cricket news. The media guidance application may add the cricket scores back to the user's suggested reading list in response to determining that the subject matter of cricket scores is not inconsistent with the user profile.

In some embodiments, the media guidance application may determine, using control circuitry 304, trending topics associated with the list of the plurality of media assets, and provide these trending topics to the user. For example, the media guidance application may determine that the user's location is Los Angeles, and the list of the plurality of media assets comprises several news stories about Los Angeles. The media guidance application may determine that a currently trending topic in Los Angeles is "Oscars" since the "Oscars" are an awards show that takes place in Los Angeles every year. The media guidance application may provide this trending topic to the user along with the list of the plurality of media assets. This may enable the user to determine that the "Oscars" are a popular topic of conversation at the user's location.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method.

Figure 8:
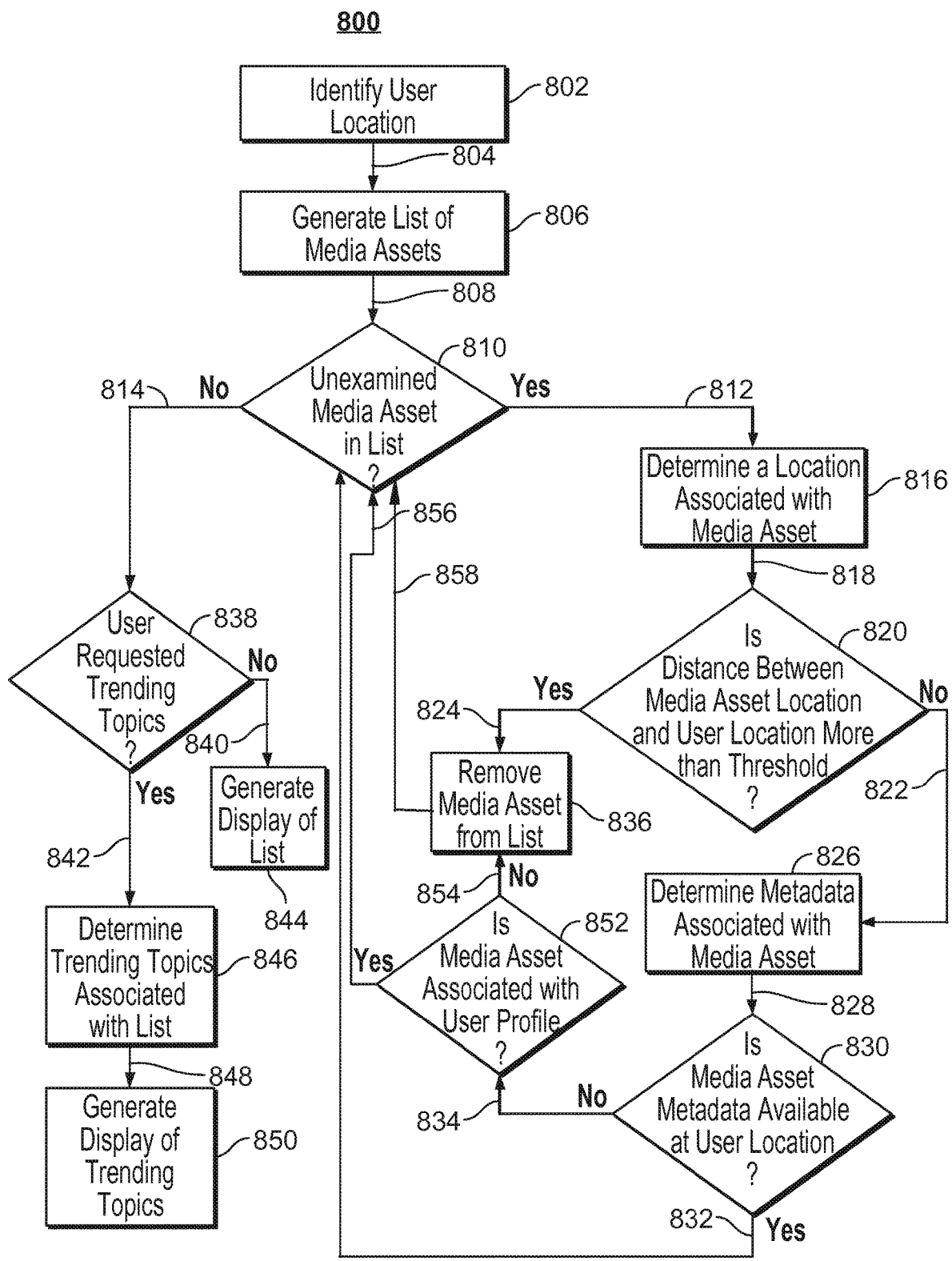
FIG. 8 is a flowchart of illustrative steps for removing media assets inconsistent with a user location and a user profile, in accordance with some embodiments of the disclosure.

FIG. 8 is a flowchart of illustrative steps for recommending a media asset based on a user location and a user profile in accordance with some embodiments of the disclosure. It should be noted that the process 800 or any step thereof could be performed on, or provided by, any of the devices shown in FIGS. 3-5. For example, process 800 may be executed by processing circuitry 304 (FIG. 3) as instructed by processing circuitry implemented on user equipment 402, 404, and/or 406 (FIG. 4) in order to provide information to a user. In addition, one or more steps of process 800 may be incorporated into or combined with one or more steps of any other process or embodiment.

Process 800 may begin at block 802 when the media guidance application identifies, using control circuitry 304, the user location. This may happen as described in relation to block 702.

Process 800 may proceed on path 804 to block 806 when the media guidance application generates, using control circuitry 304, a list of a plurality of media assets. This may happen as described in relation to block 704. In some embodiments, the media guidance application may generate a list of media assets not related to a user profile. For example, the media guidance application may generate a list of newly available media assets.

Process 800 may proceed on path 808 to block 810 when the media guidance application determines, using control circuitry 304, if there are any unexamined media assets in the list of the plurality of media assets. The media guidance application may examine each media asset in the list of the plurality of media assets sequentially to determine whether the subject matter of each media asset is inconsistent with the user location. In some embodiments, the media guidance application may examine the media assets in parallel.

If there are unexamined media assets in the list of the plurality of media assets, process 800 may proceed on path 812 to block 816 when the media guidance application determines, using control circuitry 304, a location associated with the media asset. The location of the media asset may be determined by analyzing the metadata associated with the media asset.

Process 800 may proceed on path 818 to block 820 when the media guidance application determines, using control circuitry 304, if the distance between the media asset location and the user location is more than a threshold distance. In some embodiments, the threshold distance may be zero, that is, the media asset location needs to be the same as the user location for the media guidance application to determine that the media asset is consistent with the user location. In some embodiments, the threshold may be a default value that can be modified by a user. In some embodiments, the threshold may be measured in units of distance, such as 100 miles or 250 kilometers. In some embodiments, the threshold may be measured in boundaries, such as within the same state or within the same country.

In response to determining that the distance between the media asset location and the user location is less than the threshold distance, process 800 may proceed on path 822 to block 826 when the media guidance application determines, using control circuitry 826, metadata associated with the media asset. This metadata may include information about the weather associated with the media asset and the objects presented in the media asset.

Process 800 may proceed on path 828 to block 830 when the media guidance application determines, using control circuitry 304, if the media asset metadata is available at the user location. This determination may comprise determining if the weather associated with the media asset is common at the user location, or if the objects presented in the media asset are available at the user location.

In response to determining that the media asset metadata is available at the user location, process 800 may proceed on path 832 to block 810 when the media guidance application determines if there are any unexamined media assets remaining in the list. The media guidance application may mark the media asset that was currently examined as having been examined, so that it is not examined again.

In response to determining that the media asset metadata is not available at the user location, process 800 proceeds on path 834 to block 852 when the media guidance application determines, using control circuitry 304, if the media asset is associated with the user profile. The media asset may be associated with the user profile if the metadata of the media asset corresponds to the metadata of the user profile, indicating that the user is likely to have an interest in the media asset.

In response to determining that the media asset is associated with the user profile, process 800 proceeds on path 856 to block 810, when the media guidance application determines if there are any unexamined media assets remaining in the list. The media guidance application may perform similar actions for path 856 as for path 832.

In response to determining that the distance between the media asset location and the user location is more than the threshold distance, process 800 may proceed on path 824 to block 836. In response to determining that the media asset is not associated with the user profile, process 800 may proceed on path 854 to block 836. At block 836, the media guidance application may remove, using control circuitry 304, the media asset from the list. The media guidance application may remove the media asset from the list because the media asset has subject matter inconsistent with the user location. The media guidance application may then proceed on path 858 to block 810. The media guidance application may perform similar actions for path 858 as for path 832.

In response to determining that there are no unexamined media assets in the list, process 800 proceeds on path 814 to block 838 when the media guidance application determines, using control circuitry 304, if the user requested trending topics associated with the list of the plurality of media assets. The media guidance application may access user preferences to determine if the user requested trending topics. In some embodiments, the media guidance application may present trending topics without checking the user's preferences. In this situation, the media guidance application may perform the actions associated with blocks 844, 846, and 850.

In response to determining the user did not request trending topics, process 800 proceeds on path 840 to block 844 when the media guidance application generates, using control circuitry 304, a display of the list of the plurality of media assets. This display may include information about each media asset in the list of the plurality of media assets. For example, a title or summary of each media asset may be displayed.

In response to determining the user requested trending topics, process 800 proceeds on path 842 to block 846 when the media guidance application determines, using control circuitry 304, trending topics associated with the list of the plurality of media assets. The media guidance application may cross reference a list of currently trending topics with metadata associated with the list of the plurality of media assets to determine the trending topics associated with the list.

Process 800 may proceed on path 848 to block 850 when the media guidance applications generates, using control circuitry 304, a display of the trending topics determined in block 846. In some embodiments, the media guidance application may display the trending topics as well as context associated with them. The context associated with the trending topics may include media assets, user communications, audiovisual content, and the like.

It is contemplated that the steps or descriptions of FIG. 8 may be used with any other embodiment of this disclosure. In addition, the steps and descriptions described in relation to FIG. 8 may be done in alternative orders or in parallel to further the purposes of this disclosure. For example, each of these steps may be performed in any order or in parallel or substantially simultaneously to reduce lag or increate the speed of the system or method.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for recommending a media asset based on a location associated with a user, the method comprising:
    identifying the location associated with a user profile or a user device;
    generating a list of a plurality of media assets that match the user profile;
    in response to determining that the media asset from the list was previously accessed, replacing the identified location with a subject matter location of the previously accessed media asset if the subject matter location of the previously accessed media asset is inconsistent with the identified location;
    generating, for display, respective media asset identifiers of the plurality of media assets;
    determining whether one or more objects presented as subject matter in a first media asset of the plurality of media assets is banned at the identified location; and
    in response to determining that the one or more objects presented as the subject matter in the first media asset is banned at the identified location, generating, for display an explanation of the one or more objects determined as banned, wherein the explanation includes a reason why the one or more objects is banned and the explanation is generated based on the identified location associated with the user profile or the user device.

2. The method of claim 1, further comprising:
automatically updating the identified location associated with the user device;
determining whether subject matter of a second media asset of the plurality of media assets is banned at the updated location; and
removing the second media asset from the list in response to determining that the subject matter of the second media asset is banned at the updated location.

3. The method of claim 1, wherein determining whether the subject matter of the first media asset of the plurality of media assets is banned at the identified location further comprises determining that a media asset location associated with the first media asset is not the same as the identified location associated with the user profile or the user device.

4. The method of claim 1, wherein determining whether the subject matter of the first media asset of the plurality of media assets is banned at the identified location further comprises determining that a distance between a media asset location associated with the first media asset and the identified location associated with the user profile or the user device is greater than a threshold distance.

5. The method of claim 1, wherein generating the list of the plurality of media assets further comprises:
determining a plurality of trending topics associated with the list of the plurality al media assets; and
generating for display the plurality of trending topics.

6. The method of claim 1, Further comprising:
identifying a keyword that is popular among a plurality of user communications on a social network;
generating a trending topic in response to identifying the keyword;
searching a second list of a plurality of media assets that match the user profile to identify a given media asset in the second list that includes subject matter that matches subject matter of the trending topic; and
in response to identifying the given media asset, causing the trending topic to be presented to the user together with the given media asset.

7. The method of claim 1, wherein, in response to determining that the one or more objects presented as the subject matter in the first media asset is not banned at the identified location, generating, for display an explanation, wherein the explanation includes a reason why the one or more objects are relevant to the user associated with the user profile.

8. The method of claim 1, wherein, in response to determining that the one or more objects presented as the subject matter in the first media asset is not banned, displaying an explanation that includes a reason why the first media asset is considered inconsistent with the identified location.

9. A system for recommending a media asset based on a location associated with a user, the system comprising control circuitry configured to:
identify the location associated with a user profile or a user device;
generate a list of a plurality of media assets that match the user profile;
in response to determining that the media asset from the list was previously accessed, replace the identified location with a subject matter location of the previously accessed media asset if the subject matter location of the previously accessed media asset is inconsistent with the identified location;
generate, for display, respective media asset identifiers of the plurality of media assets;
determine whether one or more objects presented as subject matter in a first media asset of the plurality of media assets is banned at the identified location; and
in response to determining that the one or more objects presented as the subject matter in the first media asset is banned at the identified location, generate, for display an explanation of the one or more objects determined as banned, wherein the explanation includes a reason why the one or more objects is banned and the explanation is generated based on the identified location associated with the user profile or the user device.

10. The system of claim 9, wherein the control circuitry is further configured to:
automatically update the identified location associated with the user device;
determine whether subject matter of a second media asset of the plurality of media assets is banned at the updated location; and
remove the second media asset from the list in response to determining that the subject matter of the second media asset is banned at the updated location.

11. The system of claim 9, wherein the control circuitry configured to determine whether the subject matter of the first media asset of the plurality of media assets is banned at the identified location is further configured to determine that a media asset location associated with the first media asset is not the same as the identified location associated with the user profile or the user device.

12. The system of claim 9, wherein the control circuitry configured to determine whether the subject matter of the first media asset of the plurality of media assets is banned at the identified location is further configured to determine that a distance between a media asset location associated with the first media asset and the identified location associated with the user profile or the user device is greater than a threshold distance.

13. The system of claim 9, wherein the control circuitry configured to generate the list of the plurality of media assets is further configured to:
determine a plurality of trending topics associated with the list of the plurality of media assets; and
generate for display the plurality of trending topics.

14. The system of claim 9, wherein the control circuitry is further configured to:
identify a keyword that is popular among a plurality of user communications on a social network;
generate a trending topic in response to identifying the keyword;
search a second list of a plurality of media assets that match the user profile to identify a given media asset in the second list that includes subject matter that matches subject matter of the trending topic; and
in response to identifying the given media asset, cause the trending topic to be presented to the user together with the given media asset.

* * * * *

UNITED STATES PATENT AND TRADEMARK OFFICE
CERTIFICATE OF CORRECTION

PATENT NO. : 11,023,541 B2
APPLICATION NO. : 14/673393
DATED : June 1, 2021
INVENTOR(S) : Daren Gill et al.

Page 1 of 1

It is certified that error appears in the above-identified patent and that said Letters Patent is hereby corrected as shown below:

In the Claims

Claim 5, Column 33, Line 31, please change "al" to --of--

Claim 6, Column 33, Line 33, please change "Further" to --further--

Signed and Sealed this
Twenty-seventh Day of July, 2021

Drew Hirshfeld
*Performing the Functions and Duties of the
Under Secretary of Commerce for Intellectual Property and
Director of the United States Patent and Trademark Office*